(12) United States Patent
Ngiau et al.

(10) Patent No.: US 9,114,736 B2
(45) Date of Patent: Aug. 25, 2015

(54) VEHICLE SEAT ASSEMBLY WITH EASY-ENTRY MECHANISM

(75) Inventors: Christopher Ngiau, Novi, MI (US); Jonathan A. Calhoun, Linden, MI (US)

(73) Assignee: Magna Seating Inc., Aurora, Ontario (CA)

( * ) Notice: Subject to any disclaimer, the term of this patent is extended or adjusted under 35 U.S.C. 154(b) by 241 days.

(21) Appl. No.: 13/697,377

(22) PCT Filed: May 17, 2011

(86) PCT No.: PCT/CA2011/000585
§ 371 (c)(1),
(2), (4) Date: Nov. 12, 2012

(87) PCT Pub. No.: WO2011/143759
PCT Pub. Date: Nov. 24, 2011

(65) Prior Publication Data
US 2013/0057041 A1    Mar. 7, 2013

Related U.S. Application Data

(60) Provisional application No. 61/395,717, filed on May 17, 2010.

(51) Int. Cl.
*B60N 2/12* (2006.01)
(52) U.S. Cl.
CPC ........................................ *B60N 2/12* (2013.01)
(58) Field of Classification Search
CPC ......................................................... B60N 2/12
USPC .......................................................... 297/341
See application file for complete search history.

(56) References Cited

U.S. PATENT DOCUMENTS

| | | | |
|---|---|---|---|
| 5,695,247 A * | 12/1997 | Premji | 297/341 |
| 5,927,809 A | 7/1999 | Tame | |
| 6,336,679 B1 | 1/2002 | Smuk | |
| 6,641,218 B2 | 11/2003 | Ito et al. | |
| 6,736,461 B2 * | 5/2004 | Blair et al. | 297/378.12 |
| 6,739,668 B2 * | 5/2004 | Coman et al. | 297/378.12 |
| 6,767,063 B1 | 7/2004 | Abdella et al. | |
| 6,857,702 B2 | 2/2005 | Becker et al. | |
| 7,021,716 B2 | 4/2006 | Persad et al. | |
| 7,204,556 B2 | 4/2007 | Schwerdtner et al. | |
| 7,380,885 B2 | 6/2008 | Fischer et al. | |

(Continued)

FOREIGN PATENT DOCUMENTS

JP    2004155228    6/2004

*Primary Examiner* — Elizabeth A Plummer
(74) *Attorney, Agent, or Firm* — Miller Canfield

(57) ABSTRACT

A seat assembly includes a seat cushion, a seat back for pivotal movement between an upright position, a plurality of reclined positions, a fold flat position, and a dumped position. A recliner assembly is coupled between the seat cushion and seat back for actuation between locked and unlocked conditions allowing pivotal movement of the seat back. A seat track is coupled to the seat cushion for actuation between locked and unlocked conditions allowing fore and aft sliding movement of the seat assembly. An easy-entry mechanism is coupled to the recliner assembly and the seat track for actuating the recliner assembly and the seat track to the unlocked conditions and providing movement of the seat assembly to an easy-entry position defined by the seat back pivoted to the dumped position and the seat track sliding the seat assembly to a full-forward position allowing access behind the seat assembly.

9 Claims, 8 Drawing Sheets

(56) References Cited

U.S. PATENT DOCUMENTS

| | | |
|---|---|---|
| 7,503,099 B2 | 3/2009 | Pejathaya |
| 7,686,397 B2 | 3/2010 | Sahi |
| 7,686,398 B2 | 3/2010 | Yokoyama |
| 8,033,607 B2 * | 10/2011 | Kojima et al. ............. 297/367 P |
| 8,632,128 B2 * | 1/2014 | Omori ........................... 297/341 |
| 2003/0127898 A1 * | 7/2003 | Niimi et al. .................... 297/367 |
| 2007/0063565 A1 * | 3/2007 | Habedank et al. ............ 297/341 |
| 2009/0195044 A1 | 8/2009 | Wieclawski |
| 2009/0218871 A1 | 9/2009 | Wieclawski |
| 2010/0072772 A1 | 3/2010 | Gamache et al. |
| 2010/0109404 A1 | 5/2010 | Yamagishi et al. |
| 2010/0133886 A1 | 6/2010 | Gi et al. |
| 2010/0171351 A1 | 7/2010 | Thiel et al. |
| 2010/0176641 A1 | 7/2010 | Hayakawa et al. |
| 2010/0225151 A1 | 9/2010 | Michalak et al. |
| 2012/0104820 A1 * | 5/2012 | Muck ........................... 297/341 |
| 2012/0248841 A1 * | 10/2012 | Hellrung et al. ........... 297/354.1 |
| 2013/0285428 A1 * | 10/2013 | Livesey et al. ............... 297/317 |

\* cited by examiner

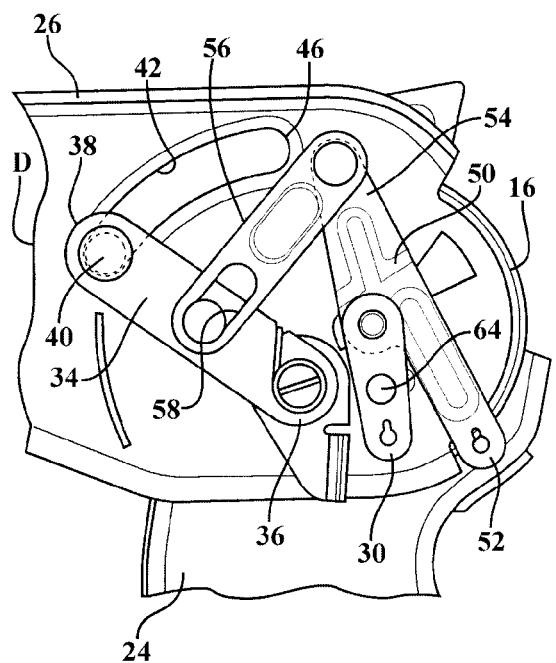
FIG. 6
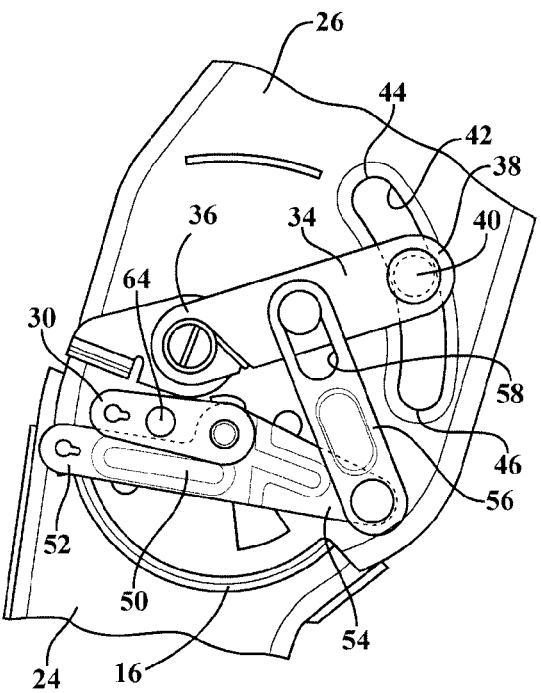
FIG. 8
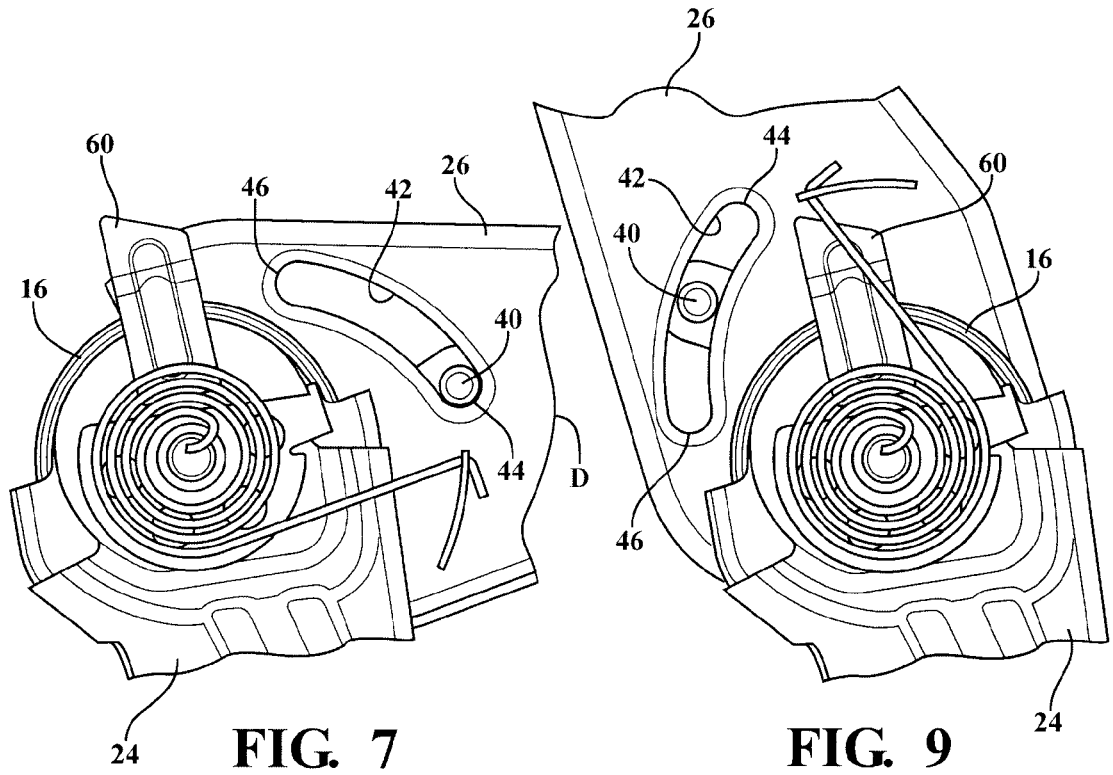
FIG. 7
FIG. 9

VEHICLE SEAT ASSEMBLY WITH EASY-ENTRY MECHANISM

BACKGROUND OF THE INVENTION

1. Field of the Invention

The present invention relates to a vehicle seat assembly. More particularly, the present invention relates to a vehicle seat assembly adapted to be mounted to a vehicle floor by a track assembly and including a seat back pivotally coupled to a seat cushion by a recliner assembly wherein the seat assembly includes an easy-entry mechanism for automatically releasing the recliner assembly and track assembly to position the seat assembly in an easy-entry position.

2. Description of Related Art

Automotive vehicles typically include one or more seat assemblies having a seat cushion and a seat back for supporting passengers above a vehicle floor. The seat assembly is commonly mounted to the vehicle floor by a seat track assembly for providing fore and aft adjustment of the seat assembly for passenger comfort. The seat back is also typically pivotally coupled to the seat cushion by a recliner assembly for providing pivotal movement between an upright seating position, a plurality of reclined positions, a dumped position, and a fold flat position overlying the seat cushion.

It is commonly known to provide an easy-entry mechanism for selectively unlocking the recliner assembly and the seat track assembly to enable pivoting of the seat back to the dumped position and sliding of the seat assembly to a full-forward position to allow easy ingress and egress within the vehicle behind the seat assembly.

It is desirable to provide a simple and compact easy-entry mechanism for releasing both the recliner assembly and the seat track assembly to position the seat assembly from a seating position to an easy-entry position wherein the seat back is in the dumped position and the seat assembly is in the full-forward position.

SUMMARY OF THE INVENTION

According to one aspect of the invention, a seat assembly for an automotive vehicle includes a seat back operatively coupled to a seat cushion for pivotal movement between an upright seating position, a plurality of reclined positions, a fold flat position overlying the seat cushion, and a forwardly dumped position between the upright seating position and the fold flat position. A recliner assembly is operatively coupled between the seat cushion and the seat back for selectively actuating between a locked condition and an unlocked condition allowing the pivotal movement of the seat back. A seat track assembly is coupled to the seat cushion for selective actuation between a locked condition and an unlocked condition allowing fore and aft sliding movement of the seat assembly within the vehicle. An easy-entry mechanism is operatively coupled to the recliner assembly and the seat track assembly for selectively actuating each of the recliner assembly and the seat track assembly to the unlocked conditions providing movement of the seat assembly to an easy-entry position defined by the seat back pivoted to the forwardly dumped position and the seat track assembly sliding the seat assembly to a full-forward position allowing access behind the seat assembly.

In one embodiment of the invention, a cable pin automatically passes over a sector allowing pivotal movement of the seat back to the fold flat position. The cable pin is positioned to engage the sector to actuate the easy-entry mechanism thereby moving the seat assembly to the easy-entry position.

In another embodiment of the invention, a drive pin automatically engages an easy-entry pulley to actuate the easy-entry mechanism thereby moving the seat assembly to the easy-entry position. The drive pin is positioned to pass over a sector allowing pivotal movement of the seat back to the fold flat position.

BRIEF DESCRIPTION OF THE DRAWINGS

Advantages of the present invention will be readily appreciated as the same becomes better understood by reference to the following detailed description when considered in connection with the accompanying drawings wherein:

FIG. 6 is an inner side view of the easy-entry mechanism wherein the seat back is in a fold flat position;

FIG. 7 is an outer side view of the easy-entry mechanism wherein the seat back is in the fold flat position;

FIG. 8 is an inner side view of the easy-entry mechanism upon actuation;

FIG. 9 is an outer side view of the easy-entry mechanism upon actuation;

DETAILED DESCRIPTION OF THE EMBODIMENTS

Figure 1:
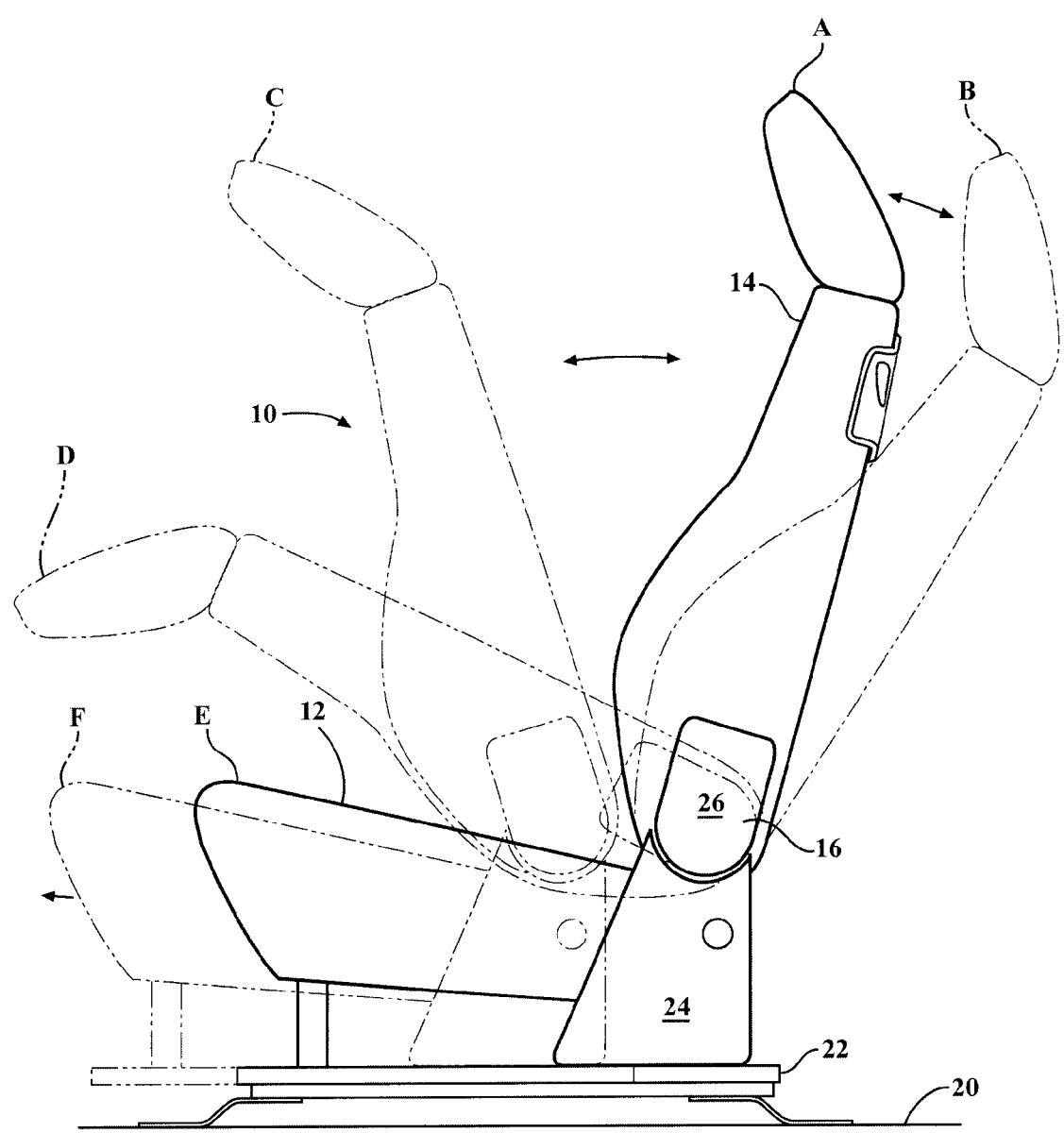
FIG. 1 is a side view of a seat assembly including a seat back operatively coupled to a seat cushion.

Referring to the Figures, wherein like numerals indicate like or corresponding parts throughout the several views, a seat assembly for use in an automotive vehicle is generally shown at 10. Referring to FIG. 1, the seat assembly 10 includes a generally horizontal seat cushion 12 and a generally upright seat back 14 operatively coupled by a recliner assembly 16 to the seat cushion 12. The recliner assembly 16 provides for pivotal movement of the seat back 14 about a pivot axis 18 between the following positions: an upright seating position A; a plurality of reclined positions disposed rearwardly of the upright seating position A, one of which is shown at B; a dumped position C disposed forwardly of the upright seating position A; and a fold flat position D wherein the seat back 14 is overlying the seat cushion 12. The seat assembly 10 is adapted to be mounted to a vehicle floor 20 by a seat track assembly 22 for providing fore and aft sliding adjustment of the seat assembly 10.

Figure 3:
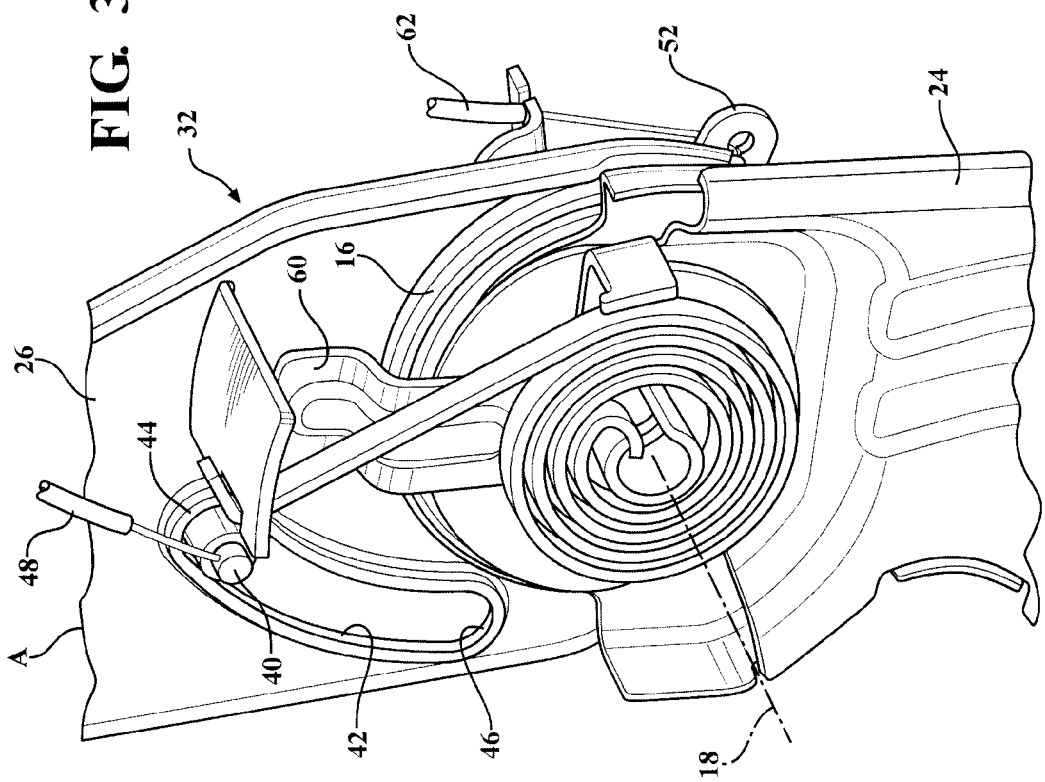
FIG. 3 is an outer perspective view of the easy-entry mechanism wherein the seat back is in the upright seating position.
Figure 2:
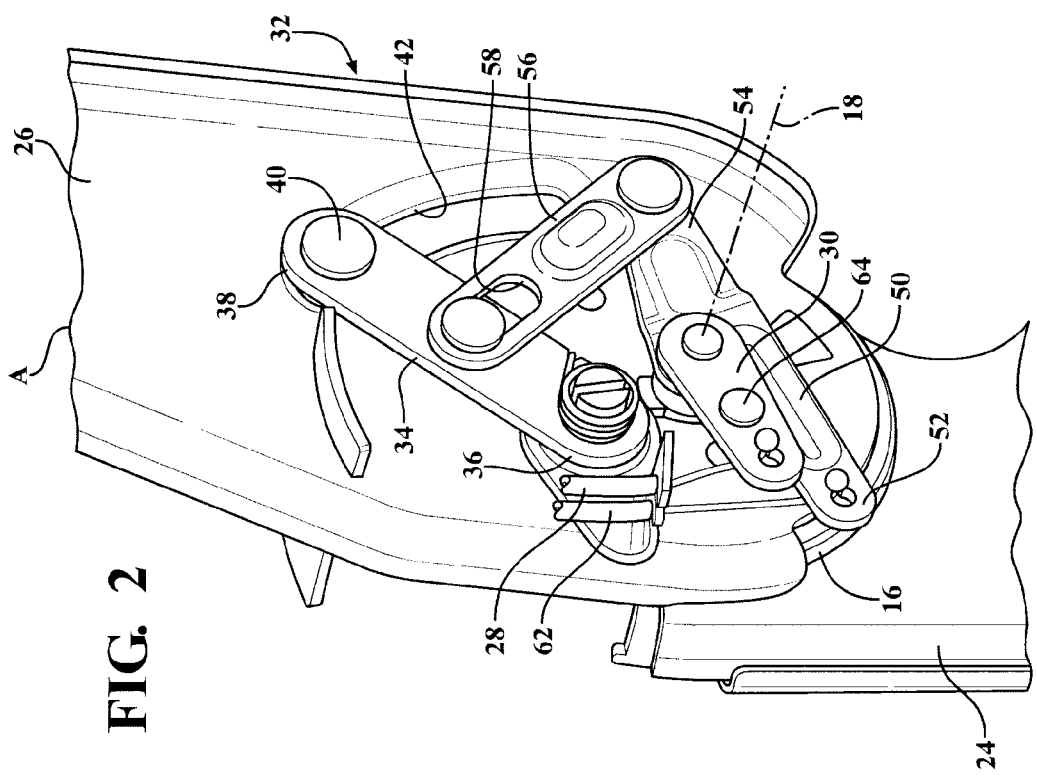
FIG. 2 is an inner perspective view of an easy-entry mechanism according to one embodiment of the invention wherein the seat back is in an upright seating position.

Referring to FIGS. 2 and 3, the seat assembly 10 includes a seat cushion mounting bracket 24 for mounting the seat cushion 12 to the seat track assembly 22 and a seat back mounting bracket 26 for pivotally mounting the seat back 14 to the seat cushion 12 about the pivot axis 18 via the recliner assembly 16. A first cable 28 extends between a first end connected to a recliner handle (not shown) and a second end connected to a release lever 30 that is operatively coupled to the recliner assembly 16. Actuation of the recliner handle pivots the release lever 30 in a first direction, which actuates the recliner assembly 16 from a locked condition to an unlocked condition allowing pivotal movement of the seat back 14 between the upright seating position A, the plurality of reclined positions B, and the fold flat position D. It should be appreciated that the recliner mechanism 16 may be any type of recliner mechanism as is commonly known to one skilled in the art without varying the scope of the invention.

The seat assembly 10 also includes an easy-entry mechanism 32 for automatically releasing the recliner assembly 16 to the unlocked condition, thus allowing pivotal movement of the seat back 14 between the upright seating position A and the dumped position C. The easy-entry mechanism 32 also provides for automatically releasing the seat track assembly 22 to an unlocked condition, thus allowing forward sliding movement of the seat assembly 10 from a seating position E to a full-forward position F, to provide easy ingress and egress within the vehicle behind the seat assembly 10.

More specifically, the easy-entry mechanism 32 includes an easy-entry lever 34 extending between a proximal end 36 pivotally coupled to the seat back mounting bracket 26 and a distal end 38 including a cable pin 40. The cable pin 40 extends laterally and is disposed in an arcuate slot 42 in the seat back mounting bracket 26. The arcuate slot 42 extends between a first end 44 and a second end 46. The easy-entry lever 34 is spring biased such that the cable pin 40 is normally positioned in a first position at the first end 44 of the arcuate slot 42. A second cable 48 extends from the cable pin 40 to a locking mechanism (not shown) on the seat track assembly 22 to selectively actuate the seat track assembly 22 from a locked condition to the unlocked condition allowing fore and aft sliding movement of the seat assembly 10, as is commonly known to one skilled in the art. An actuation arm 50 is pivotally coupled to the seat back mounting bracket 26 between a first end 52 and a second end 54 and pivots about the pivot axis 18. A connecting link 56 is pivotally coupled at one end to the second end 54 of the actuation arm 50 while the other end includes a slot 58 operatively coupling the connecting link 56 to the easy-entry lever 34. The seat cushion mounting bracket 24 includes a sector 60 fixedly secured thereto and extending above the pivot axis 18 adjacent a lower portion of the seat back mounting bracket 26. A third cable 62 extends between a first end connected to an easy-entry handle (not shown) and a second end connected to the first end 52 of the actuation arm 50. Actuation of the easy-entry handle pivots the actuation arm 50 in the first direction to engage a pin 64 extending laterally from the release lever 30 causing the release lever 30 to pivot in the first direction. Pivotal movement of the release lever 30 in the first direction actuates the recliner assembly 16 from the locked condition to the unlocked condition, allowing pivotal movement of the seat back 14 between the upright seating position A and the dumped position C. Pivotal movement of the actuation arm 50 also pulls the connecting link 56 downwardly causing the easy-entry lever 34 to pivot in the first direction which moves the cable pin 40 to a second position between the first and second ends 44, 46 of the arcuate slot 42 and tensions the second cable 48. The sector 60 is now in the path of the cable pin 40 such that the sector 60 blocks the cable pin 40 as the seat back 14 pivots forwardly toward the dumped position C thereby pulling the second cable 48 to unlock the locking mechanism on the seat track assembly 22. The seat back 14 continues to pivot forwardly until the second end 46 of the arcuate slot 42 abuts the blocked cable pin 40. The slot 58 in the connecting link 56 allows relative movement between the easy-entry lever 34 and the connecting link 56 when the sector 60 blocks the cable pin 40 as the seat back 14 pivots forwardly to the dumped position C.

Figure 4:
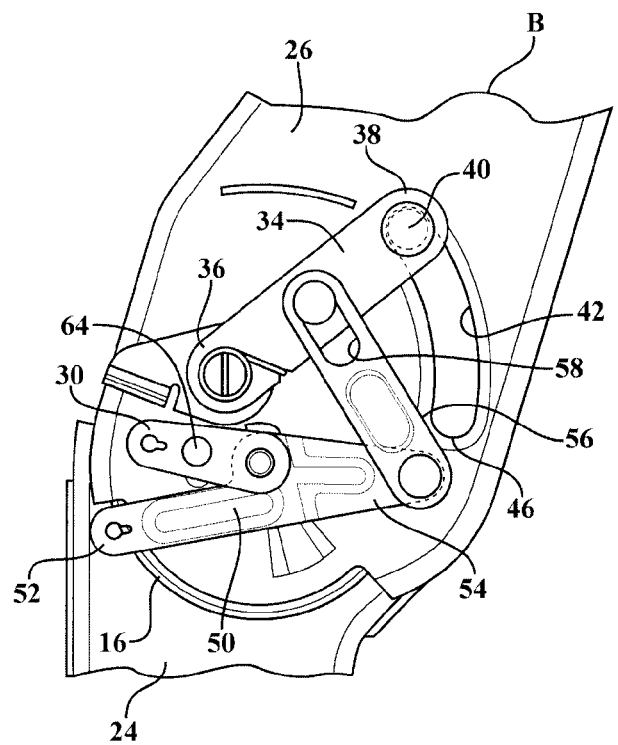
FIG. 4 is an inner side view of the easy-entry mechanism wherein the seat back is in a reclined position.
Figure 5:
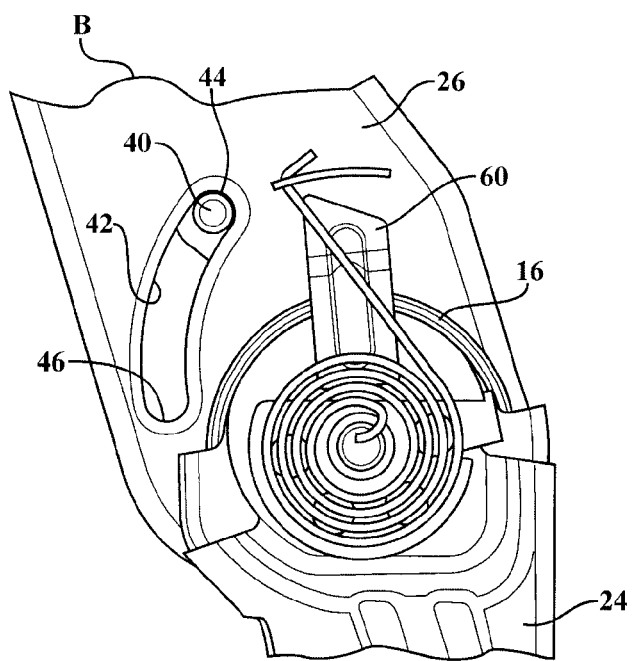
FIG. 5 is an outer side view of the easy-entry mechanism wherein the seat back is in the reclined position.

In operation, referring to FIGS. 2 and 3, with the seat assembly 10 in a seating position and the seat back 14 in the upright seating position A, the recliner assembly 16 and the seat track assembly 22 are both in the locked conditions. Actuation of the recliner handle pivots the release lever 30 in the first direction which actuates the recliner assembly 16 from the locked condition to the unlocked condition allowing pivotal movement of the seat back 14 to the plurality of reclined positions B, as shown in FIGS. 4 and 5. Alternatively, with the recliner assembly 16 in the unlocked condition and the cable pin 40 in the first position at the first end 44 of the arcuate slot 42, the seat back 14 is pivoted forwardly and the cable pin 40 passes over the sector 60 allowing the seat back 14 to pivot forwardly to the fold flat position D, as shown in FIGS. 6 and 7.

Figure 10:
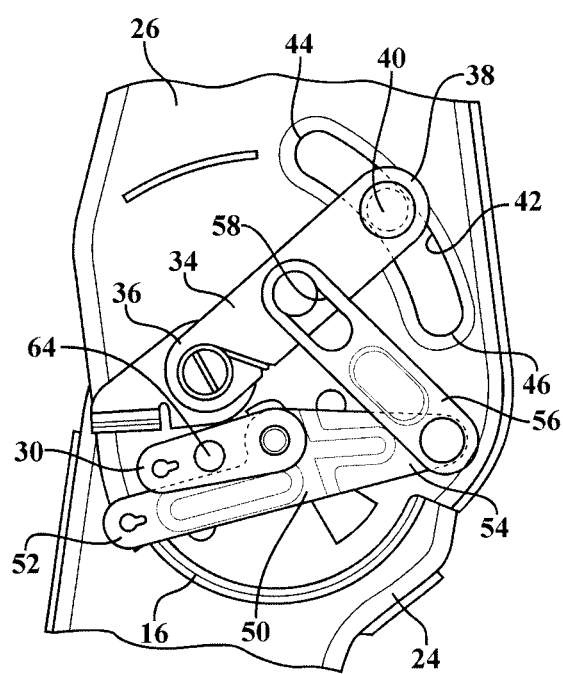
FIG. 10 is an inner side view of the easy-entry mechanism wherein the seat back is pivoting forwardly.
Figure 12:
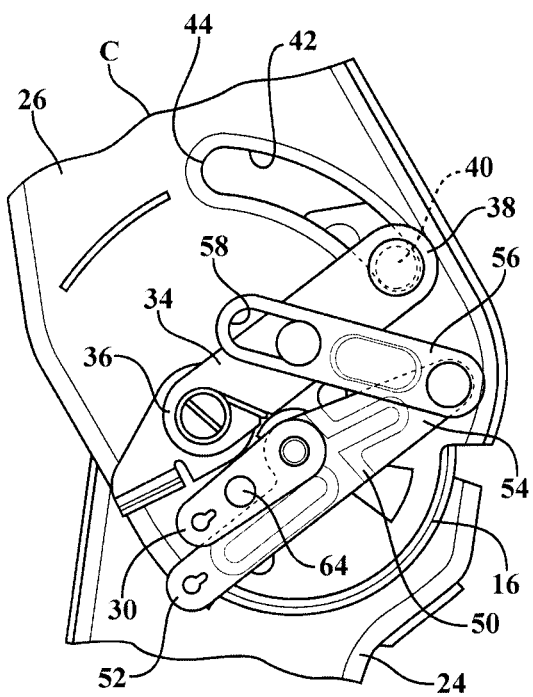
FIG. 12 is an inner side view of the easy-entry mechanism wherein the seat back is in a dumped position.
Figure 11:
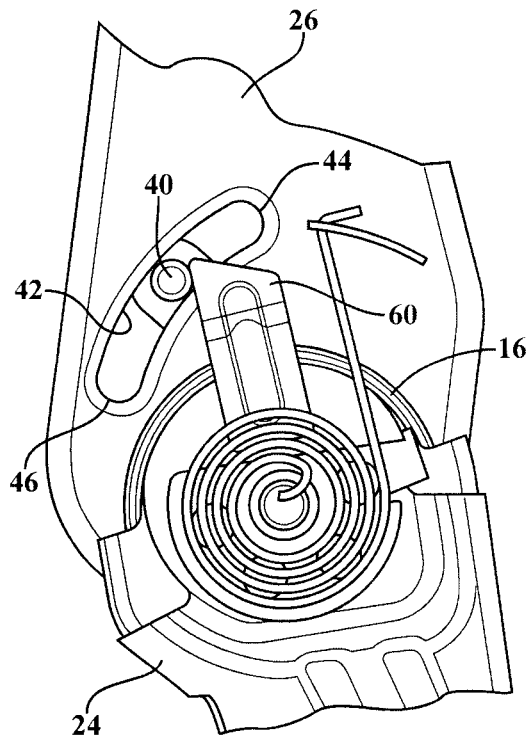
FIG. 11 is an outer side view of the easy-entry mechanism wherein the seat back is pivoting forwardly.
Figure 13:
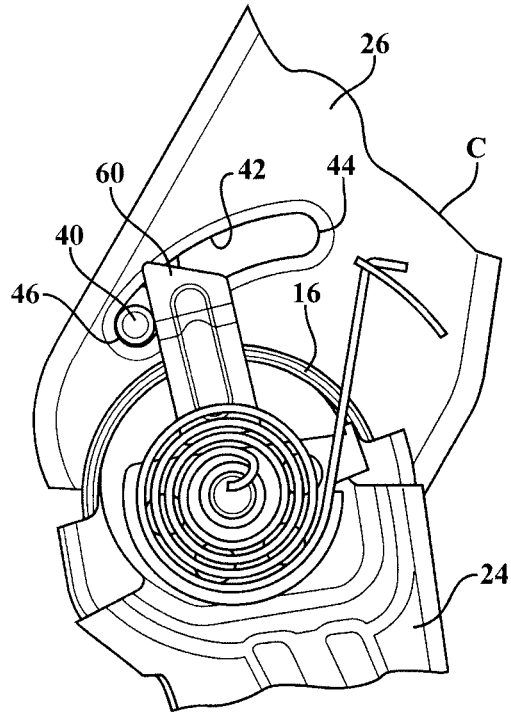
FIG. 13 is an outer side view of the easy-entry mechanism wherein the seat back is in the dumped position.

Referring to FIGS. 8 and 9, the easy-entry handle is actuated by pulling the third cable 62 which pivots the actuation arm 50 in the first direction which in turn pivots the release lever 30 in the first direction, thereby actuating the recliner assembly 16 from the locked condition to the unlocked condition. Pivoting the actuation arm 50 in the first direction pulls the connecting link 56 downwardly pivoting the easy-entry lever 34 in the first direction and moving the cable pin 40 to the second position within the arcuate slot 42, which tensions the second cable 48. As the seat back 14 pivots forwardly, the cable pin 40 engages the sector 60 pulling the second cable 48 and actuating the locking mechanism on the seat track assembly 22 from the locked condition to the unlocked condition, as shown in FIGS. 10 and 11 The seat back 14 continues to pivot forwardly until the second end 46 of the arcuate slot 42 abuts the cable pin 40, thereby blocking the seat back 14 in the dumped position C, as shown in FIGS. 12 and 13.

Figure 15:
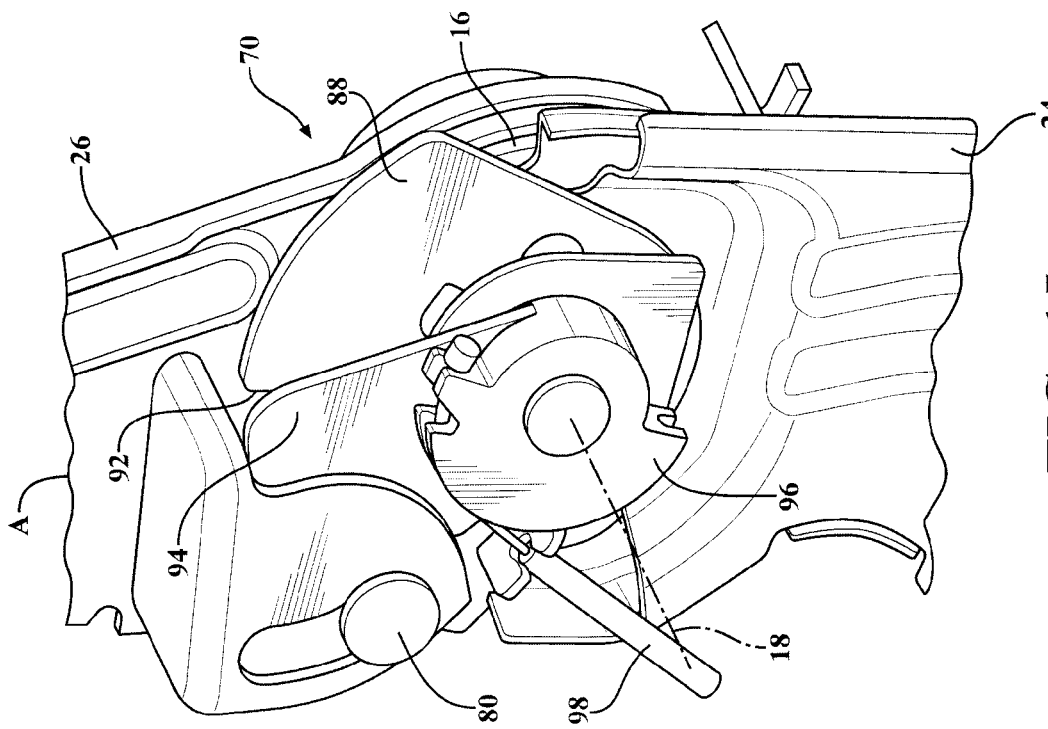
FIG. 15 is an outer perspective view of an easy-entry mechanism wherein the seat back is in the upright seating position.
Figure 14:
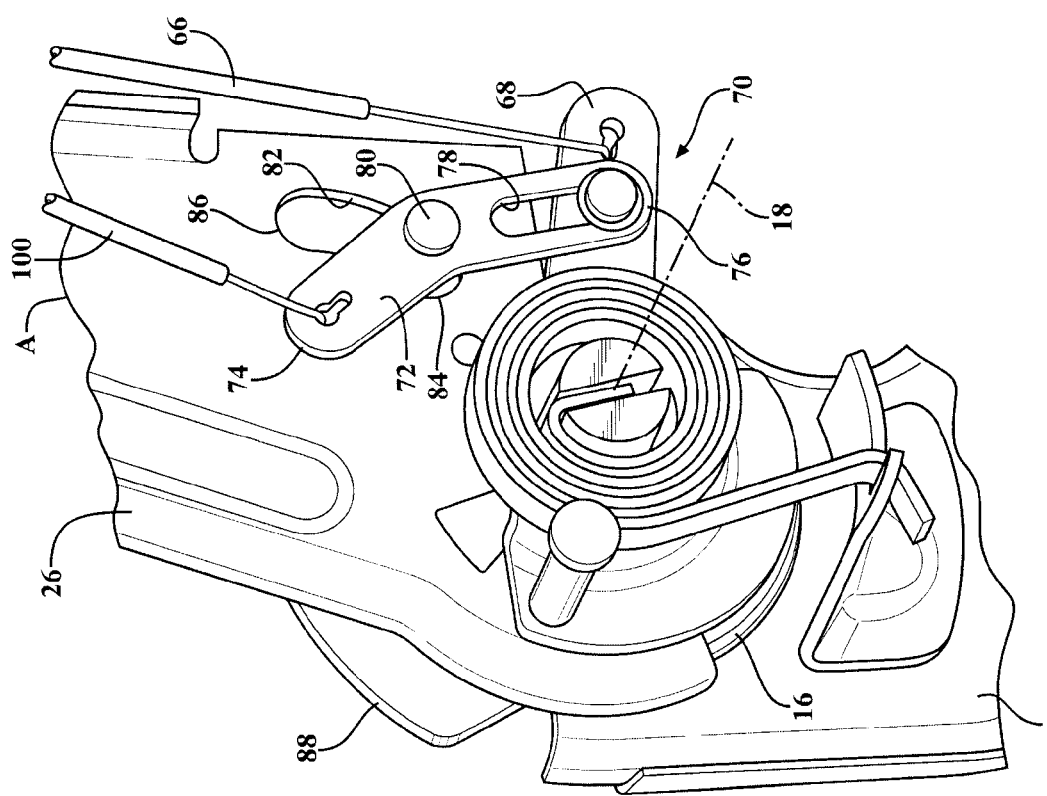
FIG. 14 is an inner perspective view of an easy-entry mechanism according to a second embodiment of the invention wherein the seat back is in the upright seating position.

In a second embodiment, referring to FIGS. 14 and 15, the seat assembly 10 includes a first cable 66 extending between a first end connected to a recliner/easy-entry handle (not shown) and a second end connected to a release lever 68 that is operatively coupled to the recliner assembly 16. Actuation of the recliner/easy-entry handle pivots the release lever 68 in a first direction, which actuates the recliner assembly 16 from the locked condition to the unlocked condition allowing pivotal movement of the seat back 14 between the upright seating position A, the plurality of reclined positions B, and the dumped position C.

The seat assembly 10 also includes an easy-entry mechanism 70 for automatically releasing the recliner assembly 16 to the unlocked condition, thus allowing pivotal movement of the seat back 14 between the upright seating position A and the dumped position C. The easy-entry mechanism 70 also provides for automatically releasing the seat track assembly 22 to the unlocked condition, thus allowing forward sliding movement of the seat assembly 10 from the seating position to the full-forward position, which provides easy ingress and egress within the vehicle behind the seat assembly 10.

Figure 17:
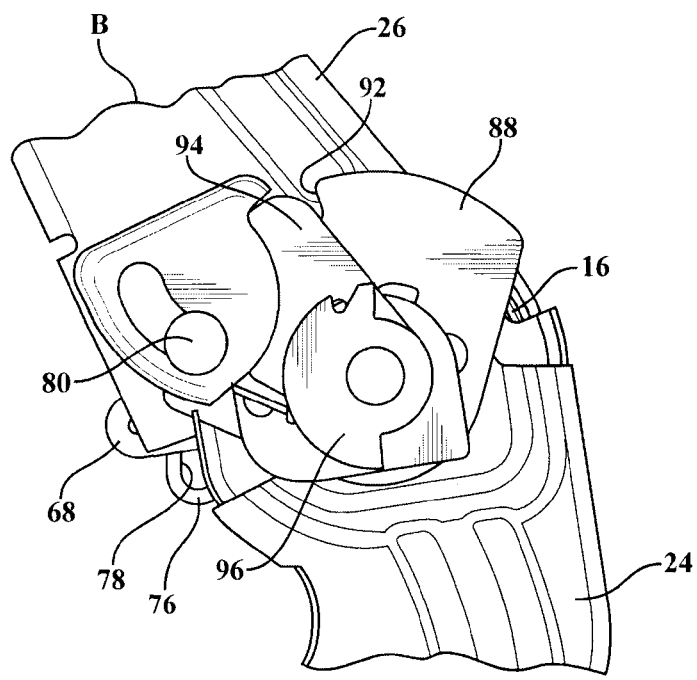
FIG. 17 is an outer side view of the easy-entry mechanism wherein the seat back is in the reclined position.
Figure 19:
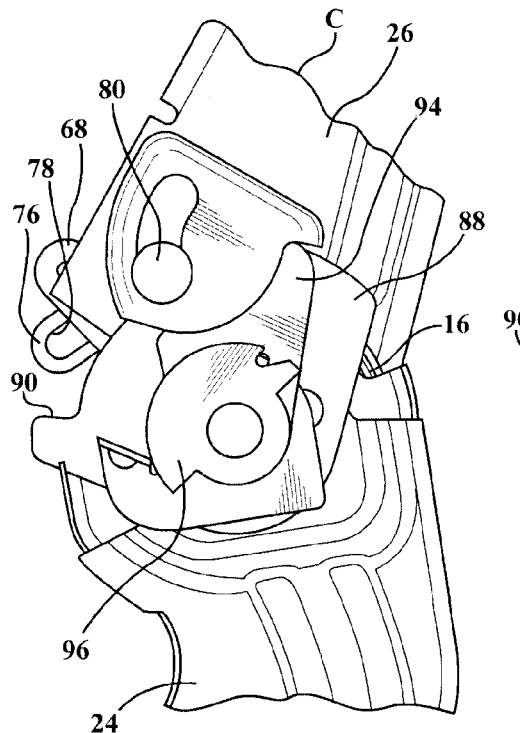
FIG. 19 is an outer side view of the easy-entry mechanism wherein the seat back is in the dumped position.
Figure 21:
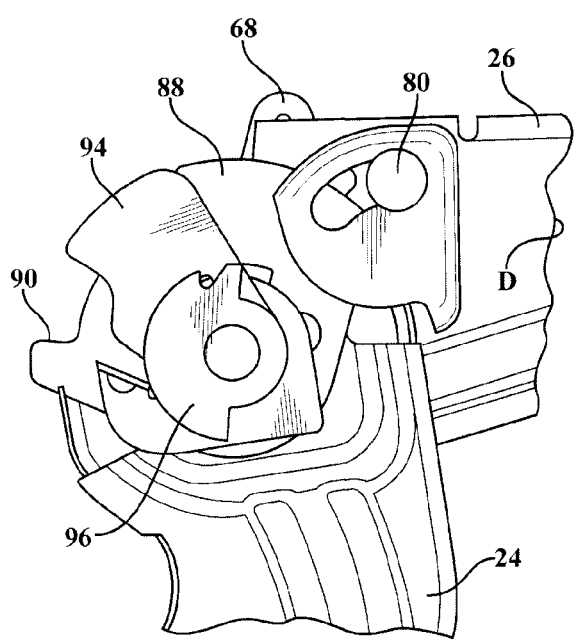
FIG. 21 is an outer side view of the easy-entry mechanism wherein the seat back is in the fold flat position.

More specifically, the easy-entry mechanism 70 includes a fold flat link 72 extending between a first end 74 and a second end 76 having a slot 78 operatively coupling the fold flat link 72 to the release lever 68. The slot 78 allows actuation of the release lever 68 in the first direction to release the recliner assembly 16 to the unlocked condition without actuating the fold flat link 72. The fold flat link 72 includes a drive pin 80 between the first end 74 and the second end 76 that extends laterally and is disposed in an arcuate slot 82 in the seat back mounting bracket 26. The arcuate slot 82 extends between a first end 84 and a second end 86. The drive pin 80 is normally positioned at the first end 84 of the arcuate slot 82. The seat cushion mounting bracket 24 includes a sector 88 fixedly secured thereto and extending above the pivot axis 18 adjacent a lower portion of the seat back mounting bracket 26. When the drive pin 80 is at the first end 84 of the arcuate slot 82 and the seat back 14 is pivoted rearwardly, the drive pin 80 engages a rear stop 90 on the profile of the sector 88 thereby defining a rearmost position of the plurality of reclined positions B of the seat back 14. The rear stop 90 is best seen in FIGS. 19 and 21. When the drive pin 80 is at the first end 84 of the arcuate slot 82 and the seat back 14 is pivoted forwardly, the drive pin 80 engages a front stop 92 on the profile of the sector 88 thereby defining the dumped position C of the seat back 14. The front stop 92 is best seen in FIGS. 15 and 17. Before the drive pin 80 engages the front stop 92 as the seat back 14 is pivoted forwardly, the drive pin 80 engages an arm 94 fixedly secured to an easy-entry pulley 96. The easy-entry pulley 96 is rotatably coupled to the seat cushion mounting bracket 24 adjacent the sector 88 and rotates about the pivot axis 18. A second cable 98 extends from the easy-entry pulley 96 to the locking mechanism on the seat track assembly 22 to selectively actuate the seat track assembly 22 from the locked condition to the unlocked condition allowing fore and aft sliding movement of the seat assembly 10. Therefore, as the seat back 14 pivots forwardly the drive pin 80 engages and rotates the easy-entry pulley 96 pulling the second cable 98 and releasing the locking mechanism to the unlocked condition.

A third cable 100 extends between a first end connected to a fold flat handle (not shown) and a second end connected to the first end 74 of the fold flat link 72. Actuation of the easy-entry handle pulls the fold flat link 72 upwardly moving the drive pin 80 to the second end 86 of the arcuate slot 82 and causing the release lever 68 to pivot in the first direction. Pivotal movement of the release lever 68 in the first direction actuates the recliner assembly 16 from the locked condition to the unlocked condition. With the drive pin 80 at the second end 86 of the arcuate slot 82 the drive pin 80 passes over the front stop 92 on the profile of the sector 88 allowing pivotal movement of the seat back 14 between the upright seating position A and the fold flat position D.

Figure 16:
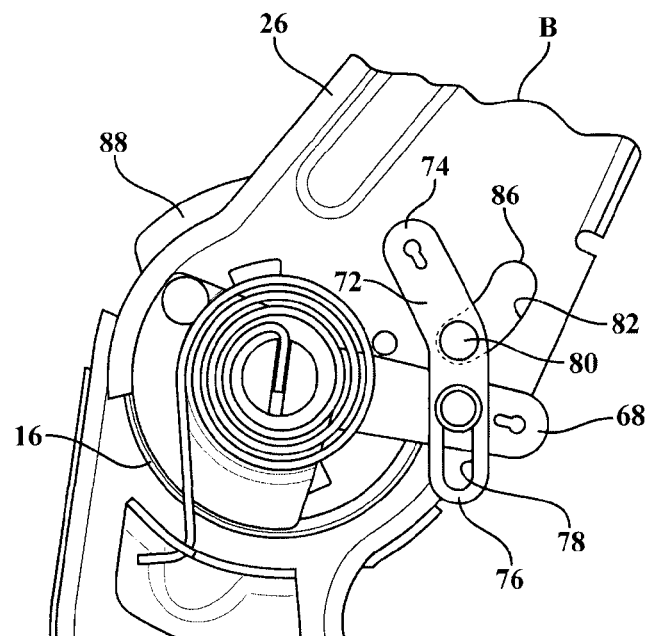
FIG. 16 is an inner side view of the easy-entry mechanism wherein the seat back is in the reclined position.
Figure 18:
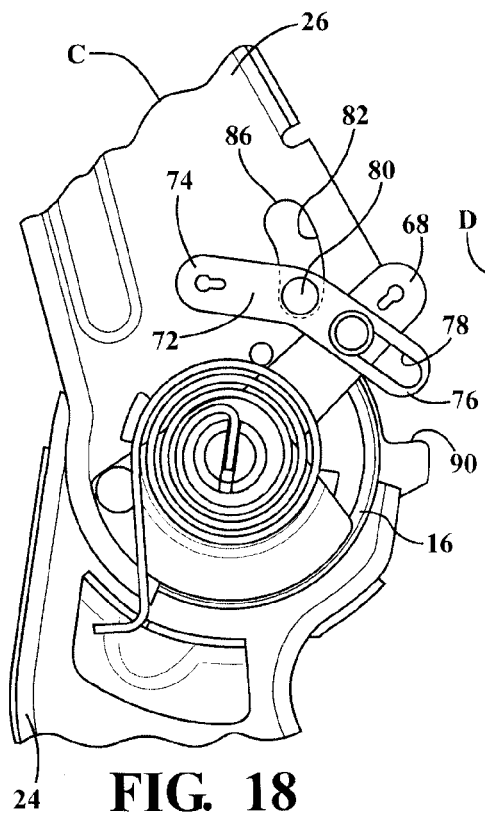
FIG. 18 is an inner side view of the easy-entry mechanism wherein the seat back is in the dumped position.

In operation, referring to FIGS. 14 and 15, with the seat assembly 10 in the seating position and the seat back 14 in the upright seating position A, the recliner assembly 16 and the seat track assembly are both in the locked conditions. Actuation of the recliner/easy-entry handle pivots the release lever 68 in the first direction which actuates the recliner assembly 16 from the locked condition to the unlocked condition allowing pivotal movement of the seat back 14 to the plurality of reclined positions B, as shown in FIGS. 16 and 17. Alternatively, with the recliner assembly 16 in the unlocked condition and the drive pin 80 at the first end 84 of the arcuate slot 82, the seat back 14 is pivoted forwardly and the drive pin 80 engages the arm 94 of the easy-entry pulley 96 pulling the second cable 98 and actuating the locking mechanism on the seat track assembly 22 from the locked condition to the unlocked condition. The seat back 14 continues to pivot forwardly until the drive pin 80 engages the front stop 92 of the sector 88 blocking the seat back 14 in the dumped position C, as shown in FIGS. 18 and 19.

Figure 20:
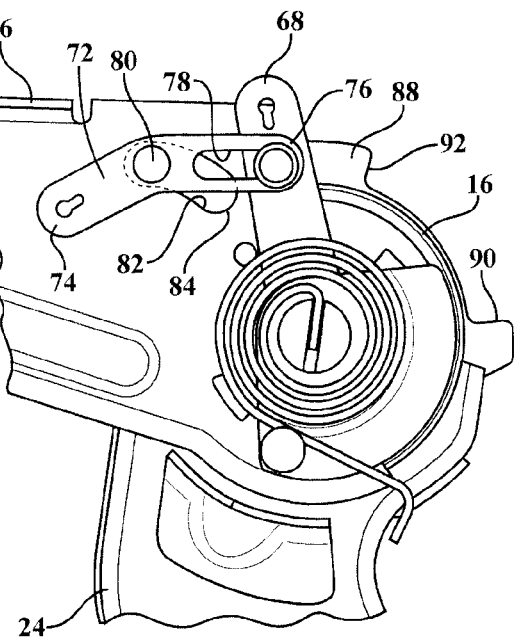
FIG. 20 is an inner side view of the easy-entry mechanism wherein the seat back is in the fold flat position.

To pivot the seat back 14 to the fold flat position, the fold flat handle is actuated to pull the third cable 100 which moves the fold flat link 72 upwardly positioning the drive pin 80 at the second end 86 of the arcuate slot 82 and pivoting the release lever 68 in the first direction, thereby actuating the recliner assembly 16 from the locked condition to the unlocked condition. As the seat back 14 pivots forwardly, the drive pin 80 passes over the front stop 92 on the sector 88 allowing the seat back 14 to pivot forwardly to the fold flat position D, as shown in FIGS. 20 and 21.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A seat assembly for an automotive vehicle comprising: a seat cushion;
   a seat back operatively coupled to said seat cushion for pivotal movement between an upright seating position, a plurality of reclined positions, a fold flat position overlying said seat cushion, and a forwardly dumped position between said upright seating position and said fold flat position;
   a recliner assembly operatively coupled between said seat cushion and said seat back for selectively actuating between a locked condition and an unlocked condition allowing said pivotal movement of said seat back;
   a release lever operatively coupled to said recliner assembly for actuating said recliner assembly between said locked condition and said unlocked condition;
   a seat track assembly coupled to said seat cushion for selective actuation between a locked condition and an unlocked condition allowing fore and aft sliding movement of said seat assembly within the vehicle;
   a seat cushion mounting bracket for mounting said seat cushion to said seat track assembly and a seat back mounting bracket for pivotally mounting said seat back to said seat cushion about a pivot axis via said recliner assembly, wherein said seat cushion mounting bracket includes a sector fixedly secured thereto, and wherein said seat back mounting bracket includes an arcuate slot extending between first and second ends; and
   an easy-entry mechanism operatively coupled to said recliner assembly and said seat track assembly for selectively actuating each of said recliner assembly and said seat track assembly to said unlocked conditions providing movement of said seat assembly to an easy-entry position defined by said seat back pivoted to said forwardly dumped position and said seat track assembly sliding said seat assembly to a full-forward position allowing access behind said seat assembly, wherein said easy-entry mechanism includes a cable pin disposed in said arcuate slot and selectively movable within said arcuate slot between a first position allowing said pivotal movement of said seat back between said upright seating position, said plurality of reclined positions, and said fold flat position, and a second position allowing said pivotal movement of said seat back between said upright seating position and said forwardly dumped position.

2. A seat assembly as set forth in claim 1 wherein said first position of said cable pin is defined at said first end of said arcuate slot and said second position of said cable pin is defined between said first and second ends of said arcuate slot, and wherein said cable pin defines an arcuate path in response to said pivotal movement of said seat back.

3. A seat assembly as set forth in claim 2 wherein said cable pin is biased to said first end of said arcuate slot.

4. A seat assembly as set forth in claim 3 wherein said cable pin is operatively coupled to said seat track assembly for actuating said seat track assembly between said locked condition and said unlocked condition in response to said pivotal movement of said seat back between said upright seating position and said forwardly dumped position.

5. A seat assembly as set forth in claim 4 wherein said sector is disposed at least partially within said arcuate path of said cable pin thereby engaging said cable pin at said second position to actuate said seat track assembly from said locked condition to said unlocked condition in response to pivotal movement of said seat back from said upright seating position to said forwardly dumped position.

6. A seat assembly as set forth in claim 5 wherein said sector engages said cable pin at said second end of said arcuate slot to block said seat back in said forwardly dumped position.

7. A seat assembly as set forth in claim 6 wherein said easy-entry mechanism further includes an actuation arm pivotally coupled to said seat cushion mounting bracket and adapted for engaging said release lever, an easy-entry lever extending between a first end pivotally coupled to said seat back mounting bracket and a second end having said cable pin fixedly secured thereto, and a connecting link operatively coupling said actuation arm and said easy-entry link together.

8. A seat assembly as set forth in claim 7 wherein pivoting said actuation arm in a first direction engages said release lever for actuating said recliner assembly from said locked condition to said unlocked condition and simultaneously pivots said easy-entry lever in said first direction moving said cable pin to said second position.

9. A seat assembly as set forth in claim 8 wherein said connecting link includes a slot operatively coupling said connecting link and said easy-entry lever thereby allowing relative movement between said connecting link and said easy-entry lever as said seat back pivots between said upright seating position and said forwardly dumped position.

* * * * *